INVENTORS
DELBERT L. GEORGE
ROBERT O. HOWE
BY Herbert W. Arnold
ATTORNEY

Dec. 3, 1963 D. L. GEORGE ETAL 3,112,520
HYDROSQUEEGEE PRESS
Filed Aug. 15, 1960 3 Sheets-Sheet 2

INVENTORS
DELBERT L. GEORGE
ROBERT O. HOWE
BY Herbert W. Arnold
ATTORNEY

Dec. 3, 1963   D. L. GEORGE ETAL   3,112,520
HYDROSQUEEGEE PRESS
Filed Aug. 15, 1960   3 Sheets-Sheet 3

INVENTORS
DELBERT L. GEORGE
ROBERT O. HOWE
BY Herbert W. Arnold
ATTORNEY

United States Patent Office 3,112,520
Patented Dec. 3, 1963

3,112,520
HYDROSQUEEGEE PRESS
Delbert L. George, Salem Depot, N.H., and Robert O. Howe, Bedford, Mass., assignors to Raytheon Company, Waltham, Mass., a corporation of Delaware
Filed Aug. 15, 1960, Ser. No. 49,749
5 Claims. (Cl. 18—5)

The invention relates to an improved method for molding fiber reinforced resin structures. More particularly the invention relates to methods, apparatus, and products involved in the production of structures of relatively large size, such as radomes, boat hulls, and analogous structures or bodies utilizing laminated fiber reinforced resins.

The molding of laminated fiber reinforced resin bodies, and particularly for such bodies of a relatively large size and of a shape wherein a self-supporting shell-like structure is required, imposes certain structural and apparatus limitations. Heretofore, the molding of large laminar structures has been effected by a process known as vacuum bag molding. Such a molding process is advantageous for fiber reinforced resin bodies of relatively moderate size and wherein surface variations or blemishes are of minor consequence. In attempts to increase the size or surface area of the molded articles, however, the vacuum bag area has necessarily been increased so as to encase the fixed mold surface and to apply the required molding pressure to the laminar lay-up. The disadvantage of the prior art methods lies in the fact that the vacuum bag of increased surface area often wrinkled and/or collapsed unevenly upon the surface of the laminated resinous lay-up upon the mold form. Wrinkles in the molding bag surface area are undesirable because they tend to transfer into the surface of the molded article and to form variations or blemishes in such surface so as to render the surface finish of the article uneven and non-uniform. Further, the wrinkles in the encasing bag are undesirable in that by not applying a uniform pressure to the molded article there is the possibility of non-uniform lamination density within the article in that areas or pockets of uncured resin or unliberated air and moisture may occur.

It is accordingly a primary object of the present invention to overcome the disadvantages attendant in the prior vacuum bag molding methods, and to provide an improved molding method for molding fiber reinforced laminar resin bodies.

A further object of the present invention is to provide an improved method for molding fiber reinforced resin bodies by means of an hydraulically actuated molding bag together with a novel means for placing such bag over the resinous lay-up.

An additional object of the present invention is to provide apparatus for causing a molding bag used in producing fiber reinforced resin bodies to selectively encase the resinous lay-up in a rolling or squeegee type action. Such action desirably overcomes the disadvantages of the prior art by applying the molding bag with no substantial wrinkles and thus uniformly forcing the resin impregnated laminations into a total contact with the mold during at least the pre-curing cycle.

Yet another object of the invention is to provide a method and apparatus for applying a molding bag to a laminated resin impregnated lay-up so as to mold and remove excess resin, air, and moisture from the lay-up while maintaining the lay-up in total contact with the mold during at least the pre-curing cycle.

A more specific object of the invention is to provide a method and apparatus for forcing a molding bag over a laminated fiber reinforced resinous body lay-up over a predetermined mold with a roll type or squeegee action as the bag is forced over the lay-up. Such roll type action being particularly efficacious in forcing the contained liquid around and through the reinforcing fibers and pushing the excess liquid from the lay-up.

An additional specific object of the invention is to provide a method and apparatus for forming various types of reinforced plastic resin products over a mold so as to assume the desired final shape or contour, particularly where such shape or contour includes raised and/or indented surface configurations. Among the advantages of the process of the present invention over that of the prior art are included: the application of a uniform and non-wrinkled bag pressure over the laminar lay-up on the mold; an attendant reduction in lay-up time due to the elimination of manual procedures to remove the bag wrinkles; the application of a uniform pressure to the lay-up in order to promote the formation of a final molded article of uniform density throughout its cross section; and the advantageous ability of molding required surface configurations into the molded article either internally or externally thereof.

It should be noted that the ability to mold internal or external surface contours or configurations into the resultant molded article will eliminate separate surface treating, etching, polishing, machining, or build-up operations in several important fields. For example, in the fabrication of molded laminated reinforced resinous plastic radomes certain designs require that attaching or securing means such as lugs, threads or the like be included in the finished molded dome in order that it may be secured to a larger base assembly. Also, in the production of larger structures including molded boat hulls, storage tanks, swimming pools and the like, there is often the requirement that certain surface contours be present in the final article. For example, in the production of certain types of boat hulls it is a requirement that a plurality of longitudinal ribbed surface members be included on the outer hull in order to either provide a decorative appearance or a practical and functional structure, such as for example the provision of ribs or contours below the water line of the hull in order to promote stability of the craft. It will be apparent that analogous surface contour configurations may advantageously be included in cast or molded resin structures for both decorative and functional purposes. In the production of molded reinforced resinous boat hulls this ability to provide ribbed or surface contour members may include internal rib structures for purposes of reinforcing or providing mounting means for additional structure within the hull.

A further advantage of the production of molded reinforced plastic structures according to the process of the invention over that of the prior molding methods lies in the reduction and moderation of the tooling and machining involved. By the elimination of the need for very accurate matched die surfaces and guide mechanisms associated therewith along with pressure means for securing the parts together in the molding relationship, the present invention has eliminated or substantially reduced the need for large expensive actuating tool mechanisms. Further, by producing a molded product of improved surface uniformity, the present invention eliminates the need for expensive and excessive post-molding, tooling or machining.

Other objects, features of novelty, and advantages of the present invention will be apparent from the following specification when read in connection with the accompanying drawings, in which one embodiment of the invention is illustrated by way of example. In such drawings, FIG. 1 is a view in side elevation and partial section of a molding installation for casting hollow structures such as domes, hulls, tanks, basins, pools or the like in accordance with the principles of the invention, wherein the molding bag apparatus is shown in its fully raised position;

Figure 1:
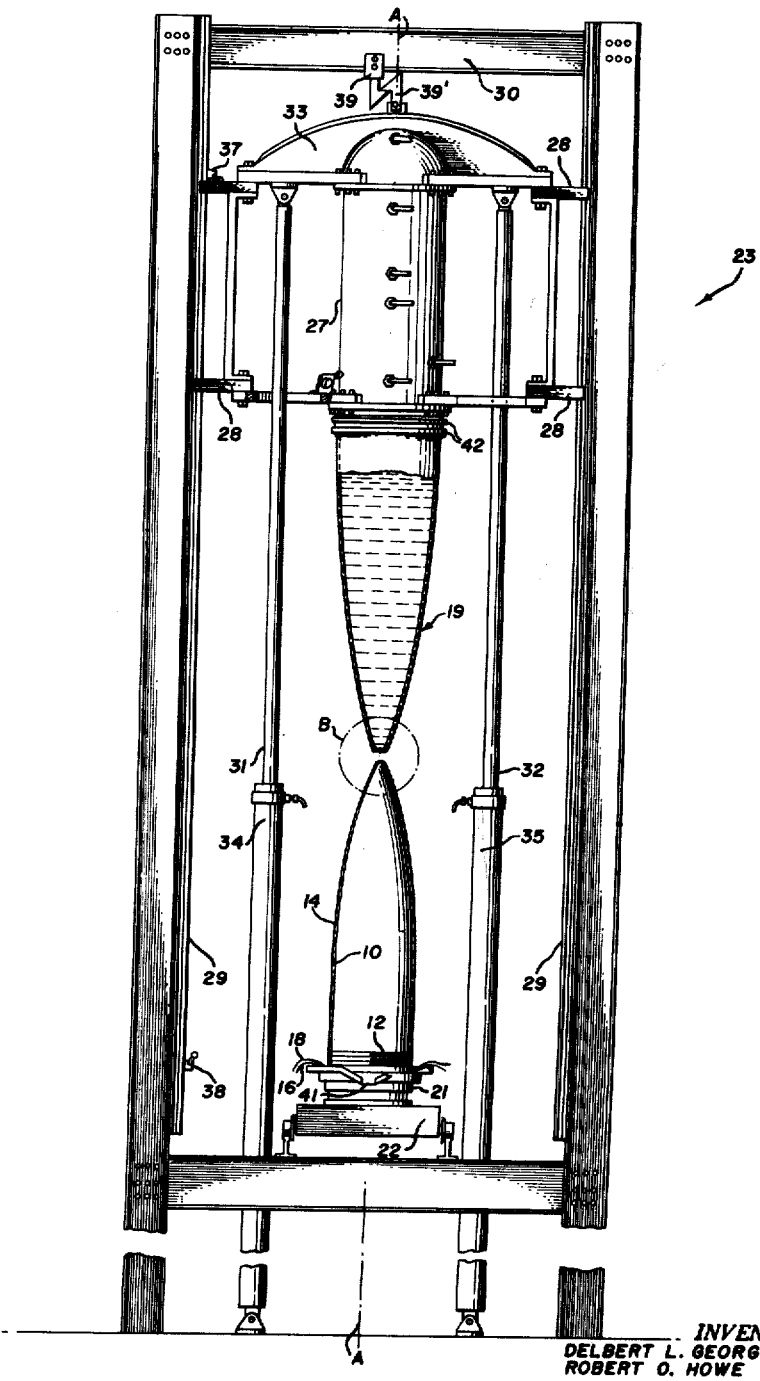

The mold assembly indicated in the drawings is intended for the casting of a relatively large self-supporting hollow laminated fiber reinforced resin structure, such as a dome. A single rigid mandrel or mold part 10 is shown which may be made of plaster or other cementitious compositions, rigid preformed plastic compositions, concrete, or a strong core fabricated of wood or metal and provided with a smooth outer surface of desired configuration, upon which surface the hollow, relatively thin-walled, reinforced plastic structure is to be cast. The outer surface of mold part 10 is generally of a uniform and smoothly finished configuration, however, certain surface details such as the thread configurations 12 may be optionally included in the mold part in order to produce a complentary molded configuration in the final cast part 14. The cast hollow structure 14 produced by the apparatus of the invention is made up in the usual manner of a series of laid-up reinforcing mats or fibrous members impregnated throughout with a casing or molding resin. Such a structure is schematically indicated in the enlarged fragmentary view of FIG. 5. It will also be noted in connection with the showing at the lower base portion of FIG. 1, that the mold part 10 may be initially covered with a layer of resilient material 16 such as, for example, burlap or the like, and that a smooth plastic bag liner 18 may be provided over such material for the purpose of promoting parting of the cast or molded shell 14 from the mold apparatus. Plastic bag liner 18 may advantageously be formed of polyvinyl acetate, which, unlike rubber, will not adhere to the plastic surface 14 being molded. Alternatively, elements 16 and 18 may be omitted, as in FIGS. 2 to 5, and a parting compound 20 may be applied directly to the mold part 10. Any suitable high-temperature grease or soap compound may be used; for example, the Dow Corning silicone compound "DC-7."

In one specific embodiment of the apparatus according to the invention, the mold part 10 may be a mandrel or circular surface of revolution when the hollow cast structure 14 is a conical radome. Such a mandrel may be supported upon the lathe face plate upon which it was turned, as indicated diagrammatically by the element 21. Mold part 10 together with the face plate 21 is supported upon a wheeled base or truck element 22. Such base 22 is secured by any suitable means, not shown, against relative movement with respect to the main press 23. After the lay-up and the pre-molding cycle or complete molding cycle, the entire assembly including the cast structure 14, the mold part 10 and the base element 22 may be removed upon its truck wheel in order to position a subsequent unit within the press 23. When the apparatus of the invention is used for a pre-molding operation only, the partially molded structure 14 may be moved while still upon the mold part 10 directly into a final heat treating or molding furnace in accordance with principles well known in the art. The wheeled truck or base 22 facilitates such movement.

A wet fiber glass, or other reinforcing material lay-up which forms the final cast or molded structure 14, is placed upon the mold 10, in accordance with usual pre-molding practice. Such lay-up may be a single or multi-ply structure. Each fiber reinforcing lamination is applied successively to the mold part 10, after having been first thoroughly impregnated with the casting resin in its liquid or semi-plaste form, including necessary modifiers and/or catalysts, in accordance with usual molding practices. Successive layers or laminations of the thus-impregnated reinforcing mats or fibrous members are applied to the surface of mold part 10, each being nominally hand-worked into substantially contiguous contact with the mold surface so as to eliminate substantial voids or air pockets. When a sufficient number of such mats have been successively applied to the mold part 10 in order to produce a finished cast structure 14 of a desired final thickness and density, the apparatus of the invention is ready for the application of the molding bag 19. Mold bag 19 is fabricated of a suitably reinforced flexible material. In the preferred embodiment such bag is fabricated from pure latex, reinforced with a plurality of Nylon woven ply members, as shown in detail in the enlarged view of FIG. 5. Bag 19 may alternatively be formed of any suitable resilient material such as synthetic rubber, for example, with the following important limitation. The bag must be sufficiently flexible so as to be applied from an inverted position above the assembly of mold part 10 and the lay-up for the final mold part 14 from an "inside-out" position above the assembly. From such position above the assembly, bag 19 is lowered upon the assembly by means of the press 23, and such initial position is shown in FIG. 1. The sequence of application of bag 19 to the assembly is shown in successive stages in FIGURES 1, 3, 2 and 4, respectively. It will be noted that the surface 24 of the bag, which surface is the initial exterior surface thereof, becomes the interior bag surface when it is applied over the assembly which is being molded. It will be appreciated that the internal dimensions of the bag when it is applied over the lay-up must be of a predetermined value so as to substantially encase the lay-up and apply thereto the necessary pressure for at least the pre-curing cycle. In accordance with the principles of the invention the application of bag 19 to the lay-up is characterized by a squeegee or rolling application which forces the excess molding resin from such lay-up by a successive and gradual application of sufficient force thereto. Therefore it will be further recognized that a second important limitation in the structure of bag 19 lies in the fact that while it should be sufficiently flexible, yet it should be non-yielding in order to apply such rolling force. The inclusion of the plurality of reinforcing laminations 26 provide such non-yielding characteristic. The reinforcing plies 26 may be woven fabric members of the type utilized in the manufacture of rubber tires, for example.

Bag 19 is suitably clamped as by the bands 42 at its outer base periphery to a tubular tank or dome member 27, and such dome is supported for vertical movement in the main press structure 23 by means of a plurality of guide members 28 which cooperate with the vertical guide elements 29 of the press. The junction between bag 19 and the dome 27 is a liquid-tight one, and during the operation of the invention the combined bag and dome are filled with a heated liquid in order to provide the necessary combined heat and pressure in order to provide the molding action.

It should be recognized that the essential part of the apparatus of the invention is the bag which is of an internal size and shape which is dimensionally similar to that of the part to be manufactured plus a necessary extension in its base dimension so as to allow for attaching it to the dome of the press mechanism. The internal size of the bag is such as to hold the lay-up in total contact with the mold 10 during at least the pre-cure cycle.

The particular details of the press structure 23 are not of prime significance to the invention. In the preferred embodiment shown in full in FIG. 1, a top cross-member 30 is provided in order to maintain the guide means or rails 29 in a stable upright vertical and parallel relationship. Member 30 may be suitably braced to fix overhead structure within the shop or plant. A suitable closing device such as an hydraulic mechanism is provided in order to lower the dome 27 at a controlled rate over the lay-up.

In the preferred embodiment the closing device comprises a pair of parallel hydraulic pistons 31, 32. A crosshead 33 is securely attached to the upper extremity of dome 27, and the pistons of the closing device react against such cross-head in order to lower or close the bag 19 over the lay-up. Pistons 31 and 32 act in a reverse manner in order to elevate the crosshead and dome. It will be understood that alternative and equivalent press mechanisms may be utilized in order to effect the closing action of the dome and bag combination over the lay-up. For example, a single piston and cylinder arrangement could be provided which could react between the cross-head 33 and the fixed cross-member 30.

In the preferred embodiment the cylinders 34 and 35 are mounted at the base of the press 23 in a fixed relation and are supplied from a common hydraulic system in order that they may drive pistons 31 and 32, respectively, with a uniform force. A suitable hydraulic reservoir, pump means, valves and pressure controlling apparatus are provided, in accordance with known practices and which are not shown, in order to regulate the closing or lowering motion of the dome and also its elevation. The usual safety and movement limiting auxiliary control means are also provided on the press 23 in accordance with known practices, and such means may include the upper limit switch 37 and lower limit switch 38 which cooperate with the upper guide member 28 and lower guide member 28, respectively. An additional safety catch and/or safety switch arrangement 39 and 39', shown schematically in FIG. 1, may be provided at the top of the press structure on elements 30 and 33 in order to positively prevent excess upward movement of the apparatus and also to provide a safety mechanical locking mechanism which will hold the dome and its related assembly mechanically secure when and if adjustments or repairs to the hydraulic mechanism are necessary.

As indicated in FIGURE 1, dome 27 is provided with a plurality of openings in order to permit the admission and extraction therefrom of an hydraulic fluid medium, a heating medium, and a pressure medium. In the FIG. 4 these dome openings are labeled "fluid," "heat," and "pressure." Although a single label opening for each such medium is shown in the latter drawing figure, and each such opening will be understood to serve both for the admission to and the extraction from the dome 27 of each medium, it will be realized that in actual practice a plurality of openings may be provided for each operation. Also, in the description of the preferred embodiment which follows, the hydraulic fluid utilized is designated as water; the heating means utilized is designated as steam; and the pressure means utilized is designated as air. Other suitable or equivalent means may be used for each of the three examples given. Thus the hydraulic fluid could be oil or another liquid of a type which did not react with the material of bag 19; the heating means could be a gaseous one other than steam or an immersion heater of suitable type including an electrical one; and the pressure means could be a gas other than air or possibly a fluid if suitable external means were provided in order to separate such pressure means from the hydraulic fluid means.

The interior of dome 27 is in communication with the body of bag 19 which is secured thereto hermetically. Water is admitted at the hydraulic fluid opening of the dome in sufficient amount to fill the volume of bag 19 when the press mechanism is in its elevated position shown in FIG. 1. Steam is admitted to the heat opening of the dome in sufficient pressure and of a sufficient temperature to heat molding bag 19 to a predetermined temperature sufficient to effect pre-curing of the lay-up when the bag encases the same. Fluid, at a controlled pressure, is admitted to the pressure opening of dome 27 in order to provide both a suitable final molding pressure over the lay-up when it is encased by the bag, and also to promote the preferred rolling contact or squeegee action when such bag is lowered over the lay-up. A suitable insulating jacket, not shown, may be provided around dome 27 in order to retain the temperature therein, and also, particularly when large cast structures are involved, the lower fixed mold part 10 may be suitably heated. Where such mold part 10 is hollow, the introduction of steam or a heated liquid may be utilized in order to provide the necessary heating.

Figure 2:
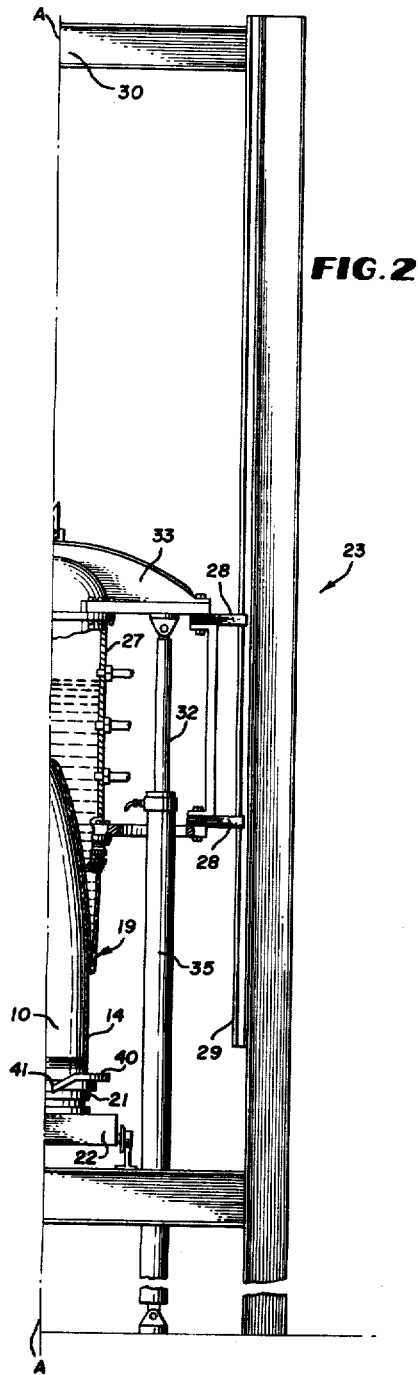
FIG. 2 is a partial sectional view showing details of the structure of FIG. 1 to the right of the axis of symmetry A—A shown therein, and showing the mold bag apparatus in its two-third down position.
Figure 3:
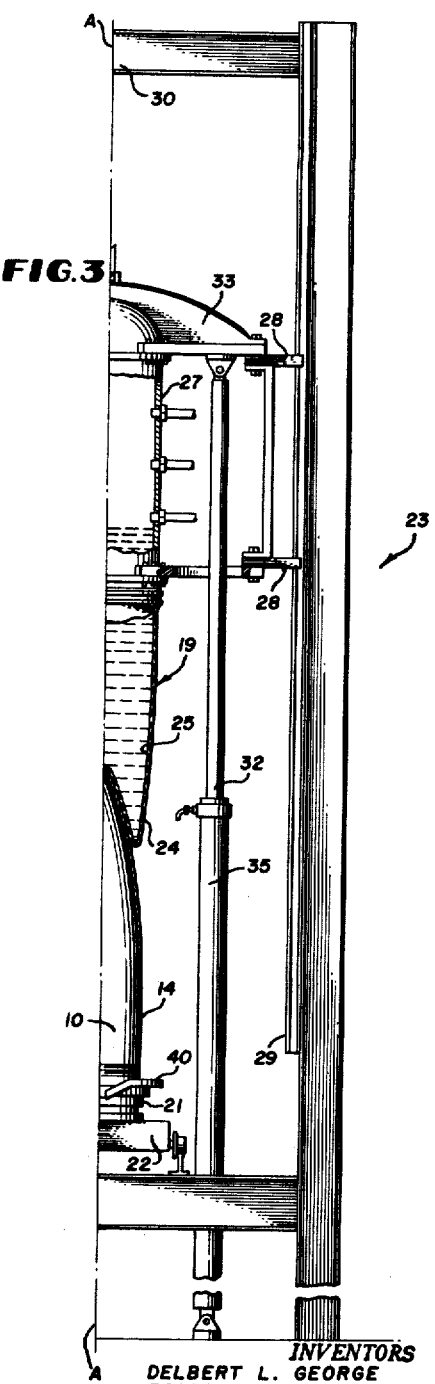
FIG. 3 is a partial sectional view similar to that of FIG. 2, but showing the bag molding apparatus in its one-quarter down position.

With the mold part 10 covered by the fiber reinforced lay-up which is thoroughly wetted with the casing resin, the closing device is set in motion to lower the dome 27 and the inverted bag 19 at a predetermined rate, forcing the bag over the lay-up with a rolling annular action as the bag is forced to its right-side-out position upwardly within the dome. Reference should be made to FIGS. 3 and 2 to understand this rolling or squeegee action. Surface 24 of the bag will fit over the lay-up of the part 14 being molded, while the surface 25 of the bag will be forced upwardly within the dome. The close dimensional fit of the bag surface 24 and the flexible nature of the bag causes the application of it over the lay-up with a rolling action which may be considered analogous to the application of a taut annular O-ring over such lay-up. The rolling or squeegee action forces the liquid resin in the lay-up around and through the interstices of the reinforcing fiber mat or material, and pushes the excess casting resinous liquid from the outer surface of the lamination of the part being molded, while maintaining the interior of the lay-up in total contact with the mold part 10. Such excess liquid molding resin is collected by means of a drain element 40 which is suitably arranged at the base of the mold part 10 so as to direct such excess liquid through the outlet 41 into a suitable sump.

The closure or lowering by means of the hydraulic mechanism is desirable maintained at a constant speed or rate. To this effect the use of a pressure compensated valve member which will provide a constant flow of hydraulic fluid to the cylinders 34 and 35 is a necessary requirement. Such requirement is necessitated by the fact that the interior of the bag 19, that is the interior portion of the inverted bag which is bounded by the surface 25 thereof, is initially filled with water when the bag is in its elevated position before application to the lay-up as shown in FIG. 1. As the bag is closed or lowered over the lay-up at a controlled rate, the water initially contained in the bag and in dome 27 is permitted to escape by an escape valve, not shown, connected to the dome. The escape valve opens in response to the application of an increased pressure within the confines of the dome in accordance with usual hydraulic theory. It will be appreciated that the reaction forces of the pistons 31 and 32 against the cross-head and thus the dome during the closure or lowering of the bag will have to be varied if the rate of lowering is to be maintained constant. Therefore, the valve means which controls the application of the hydraulic pressure to the cylinders 34 and 35 must be of a pressure compensated type which will meter a constant flow of hydraulic fluid to such pistons in order to overcome the changing pressure within the dome 27 and to roll the bag downward over the lay-up at a constant speed. Suitable gauges are provided on the several supply means, the dome, and the pressure-controlling means in order that the operator of the apparatus may make the desired adjustments before the lowering of the bag over the lay-up.

Figure 4:
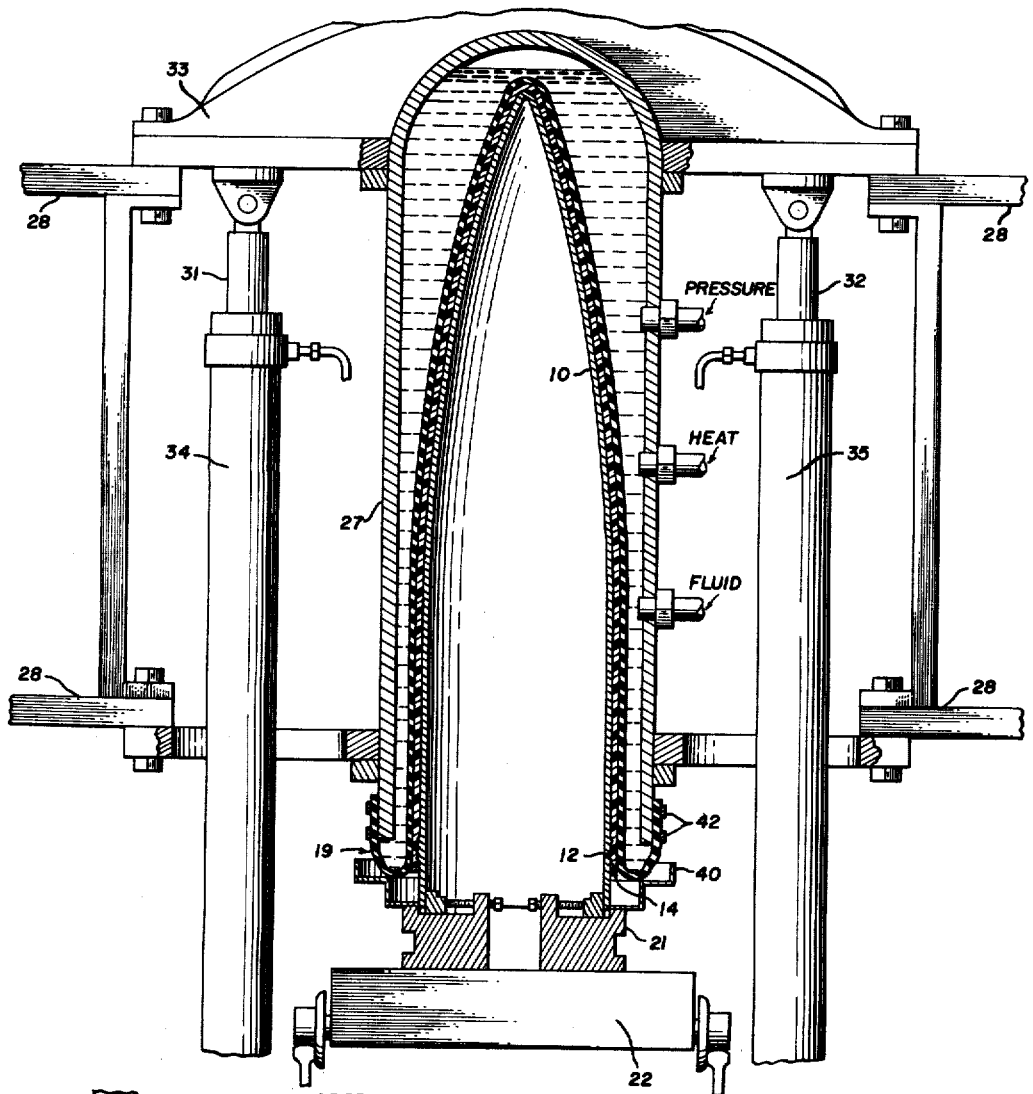
FIG. 4 is a sectional view to an enlarged scale of a portion of the molding installation of FIG. 1 showing the bag molding apparatus in its full down or curing position.
Figure 5:
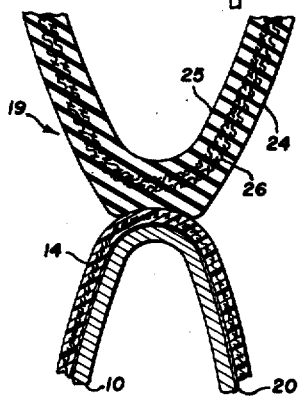
FIG. 5 is a fragmentary sectional view on an enlarged scale showing details of the shape of the molding bag end and the contact area thereof with a mold and finished article within the circled portion B of FIG. 1.

When the bag is in its completely lowered position as shown in FIG. 4, the lay-up is held in total contact with the mold part 10, and due to its internal size and shape when so applied bag 19 is dimensionally such as to be applied in wrinkle-free relationship so as to exclude any undesirable air pockets in the laminar lay-up and to express therefrom excess casting resin. The water within the molding bag is maintained at a suitable temperature by means of the steam and at a suitable pressure by means of water admitted to the dome so as to effect a cure of the laminated part 14. The required heat maintained within the bag, and the length of time such heat is applied to the lay-up will be determined in accordance with the particular resin utilized in the casting and the cross-sectional dimensions of the part 14. The pressure within the bag and the closing rate at which it is lowered over the lay-up will be determined in accordance with the several factors including the configuration of the part 14, the flexibility of the bag, the number and compressibility of the laminar lay-up elements, the viscosity or density of the casting resin fluid, and the density of the finished plastic material structure 14. With the bag pressure and closing rate determined by the several factors, once established it may be repeated with substantial accuracy. Thus the apparatus of the invention will ensure the consistency of composition from part to part of the plastic structures 14 which are cast.

Consistency of composition of the finished molded part is a characteristic of prime importance in the manufacture of such molded reinforced articles, particularly where such articles are of the type wherein uniform cross-sectional strength or density are required, as for example when such structures are to be self-supporting or to be capable of maintaining a predetermined stress as in the case of molded pressure tanks. Where the molded reinforced plastic structure is a so-called radome, the uniformity of cross-sectional composition is of importance due to the fact that such composition is related to the electromagnetic transmissive characteristic of such part, as it is a prime factor which determines the dielectric coefficient thereof.

It will be noted that in FIGURE 4 the reference numeral 12 clearly indicates a portion of the mold part 10 which provides raised and depressed surfaces of the type which will produce an internal shape or contour in the finished molded part 14. In the particular example of this invention such shape 12 is provided in order to produce internal molded threads in the finished part 14. The application of bag 19 over the lay-up forces the laminations of such lay-up to assume the internal shape or contour as determined by the portion 12 of the mold part. While mold part 10 has been described in the preferred embodiment as producing a conical cast or molded element, and the mold is described as being a surface of revolution and thus the application of the bag 19 over such surface is particularly suitable for a rolling action over an interior mold of conical, ogive or cylindrical shape; however, it is possible according to the invention to mold other shapes such as paramidal, oval, square, rectangular, curvalinear or combinations thereof using this process. It will be appreciated that ordinary molding techniques must be followed when casting certain of such shapes, as for example the use of multi-part interior molds depending upon the molded contours, in order to effect parting and removal of the mold from the finished molded structure 14.

As determined by the production desired, and the particular casting resin utilized, it is possible to produce either a pre-curing operation or a complete curing operation using the apparatus of the invention, due to the fact that the lay-up is held in total contact with the mold, and the time and temperature of the cure cycle may be varied to provide either type of operation. Where a sufficient volume of production is required, it will prove more effective to utilize the apparatus of this invention for the pre-curing cycle only, in order to release the molding bag and press apparatus for application to the next successive lay-up. It is assumed that a plurality of mold parts 10 will be provided. The partially cured structure 14, still retained upon the mold part 10, may be moved by means of the wheeled truck or base element 22 out of the press 23 and into final curing location. Hydraulic pressure is applied by the valve mechanism in a manner to elevate the dome and bag in the press structure so as to cause the bag to part from the molded product 14.

The apparatus of the present invention may be utilized in accordance with or in conjunction with several recognized molding techniques. For example, vacuum equipment may be utilized therewith in order to expedite the removal of excess resin expressed from the lay-up. However, it will be noted that the process of the invention does not require the use of vacuum equipment as an aid in holding the lay-up to the mold, since the rolling or squeegee action and the pressure imparted to the lay-up by the apparatus is sufficient to hold the lay-up in total contact with the mold while completely expressing the excess molding resin liquid. Thus, the use of vacuum equipment is not necessary in the expression of the resin liquid from the laminar lay-up except for a limited advantage in speed, which advantage is more than offset by a greater advantage provided in the saving of time and material by eliminating vacuum sealing techniques formerly used in the art.

By providing a series of molding bags of differing dimensions it is also possible in accordance with the invention to produce molded fiber laminated reinforced resin products of varying cross-section and related strength in accordance with the number of laminations or plies which are provided therein, while using the same core or mold part 10. A bag of predetermined dimensions will apply a suitable molding pressure to a lay-up of a predetermined number of overlapping laminations. Also, the same bag may be applied to lay-ups of varying numbers of laminations, depending in part upon the compressibility of the laminar reinforcing mats, and/or the required final density of the molded product produced with the apparatus.

It will be understood that various changes and modifications may be made in the configuration, composition, or structural arrangement of the features described above without departing from the scope of the invention as defined by the following claims:

What is claimed is:

1. A substantially rigid mold, a flexible substantially matching non-elastic counterpart mold suspended in the inverted position above said rigid mold and filled with liquid, means connected to said counterpart mold to receive said liquid, and means for causing relative movement of one mold against the other to cause the counterpart mold to envelope the other mold in a rolling squeegee-type action.

2. A rigid mold, a flexible substantially matching non-elastic counterpart mold suspended in the inverted position above said rigid mold and filled with liquid, chamber means connected to said counterpart mold to receive said liquid, means for causing relative movement of one mold against the other to cause the counterpart mold to envelope the other mold, a positive fluid pressure in said chamber, and means to regulate said fluid pressure.

3. A rigid mold, a flexible substantially matching non-elastic counterpart mold suspended in the inverted position above said rigid mold and filled with liquid, means connected to said counterpart mold to receive said liquid, said liquid receiving means being adapted to receive a larger amount of liquid than that of said counterpart mold, means for causing relative movement of one mold against the other to cause the counterpart mold to envelope the other mold, said means comprising means for applying a fluid pressure to said chamber, and means to regulate said pressure.

4. A rigid mold, a flexible substantially matching non-elastic counterpart mold suspended in the inverted position above said rigid mold and filled with a liquid, means connected to said counterpart mold to receive said liquid, means including fluid pressure means for causing the relative movement of one mold against the other to cause the counterpart mold to envelope the other mold in a compressive rolling squeegee-type action, and means for regulating said fluid pressure.

5. Apparatus for producing a molded article from a moldable element including, in combination, a rigid mold of predetermined dimensions, a flexible substantially non-elastic counterpart mold of related dimensions for mating therewith in final spaced relation to establish a molding space therebetween to accommodate a moldable element, a moldable element comprising a lay-up including a plurality of laminations of reinforcing fibers impregnated with an excess of liquid casting resin mounted on said rigid mold, means to initially position said flexible mold suspended above and adjacent said rigid mold in a reflexed "inside-out" condition, fluid pressure means solely and yieldably maintaining said flexible mold in such reflexed condition, fluid pressure means to lower at a constant rate said flexible mold into contact with the combination of said fixed mold and the overlying intervening moldable element by sequentially unfolding said flexible mold to selectively and sequentially encase and compress the moldable element between the molds in a rolling squeegee-type action within the resultant established molding space to force said element into final total contact with said rigid mold, said sequential compression and squeegee-type action applying a predetermined pressure to said element to express excess casting resin from the lay-up, and means to introduce heat into at least said counterpart mold for a time sufficient to at least pre-cure said lay-up.

References Cited in the file of this patent

UNITED STATES PATENTS

| | | |
|---|---|---|
| 1,459,244 | Palmer | June 19, 1925 |
| 1,559,972 | Midgley | Nov. 3, 1925 |
| 1,977,699 | Sebring et al. | Oct. 23, 1934 |
| 2,513,527 | Sjodin | July 4, 1950 |
| 2,565,949 | Clifford et al. | Aug. 28, 1951 |
| 2,730,763 | Brundage | Jan. 17, 1956 |
| 2,848,740 | Frohlich et al. | Aug. 26, 1958 |
| 2,945,262 | Petty | July 19, 1960 |
| 2,952,875 | Herrick | Sept. 20, 1960 |
| 2,962,757 | Slemmons et al. | Dec. 6, 1960 |

FOREIGN PATENTS

| | | |
|---|---|---|
| 769,094 | France | Aug. 18, 1934 |

UNITED STATES PATENT OFFICE
CERTIFICATE OF CORRECTION

Patent No. 3,112,520            December 3, 1963

Delbert L. George et al.

It is hereby certified that error appears in the above numbered patent requiring correction and that the said Letters Patent should read as corrected below.

Column 3, line 30, for "complentary" read -- complementary --; line 34, for "casing" read -- casting --; column 4, line 5, for "semi-plaste" read -- semi-paste --; column 6, line 17, for "casing" read -- casting --; line 42, for "desirable" read -- desirably --.

Signed and sealed this 5th day of May 1964.

(SEAL)
Attest:
ERNEST W. SWIDER

Attesting Officer

EDWARD J. BRENNER
Commissioner of Patents